United States Patent [19]
Jungk et al.

[11] Patent Number: 5,775,562
[45] Date of Patent: Jul. 7, 1998

[54] CONVEYING TABLE WITH STRAIGHTENING DEVICE FOR CONTINUOUSLY CONVEYING A DEFORMABLE MATERIAL STRIP

[75] Inventors: Andreas Jungk, Wedemark; Gerd Brandes, Hemmingen, both of Germany

[73] Assignee: Continental Aktiengesellschaft, Hanover, Germany

[21] Appl. No.: 743,116

[22] Filed: Nov. 1, 1996

[30]   Foreign Application Priority Data

Nov. 3, 1995 [DE] Germany ............... 195 41 095

[51] Int. Cl.$^6$ .................. B65H 26/00; B65H 20/00; B65H 23/32; B29C 43/22
[52] U.S. Cl. ............. 226/21; 226/180; 242/615.21; 264/280
[58] Field of Search .................... 226/21, 23, 180, 226/189; 264/280, 285; 242/615.3, 615.21

[56]         References Cited

U.S. PATENT DOCUMENTS

| | | | |
|---|---|---|---|
| 3,069,056 | 12/1962 | Richards et al. . | |
| 3,107,036 | 10/1963 | Richards et al. | 226/180 X |
| 3,171,579 | 3/1965 | Robertson | 226/23 X |
| 3,243,089 | 3/1966 | Cvacho et al. | 226/189 X |
| 3,343,737 | 9/1967 | Alexeff et al. . | |
| 3,373,288 | 3/1968 | Otepka et al. | 226/21 X |
| 3,664,561 | 5/1972 | Feiertag | 226/21 |
| 4,095,731 | 6/1978 | Harding et al. . | |
| 4,554,713 | 11/1985 | Chabal . | |
| 4,666,073 | 5/1987 | DuFour | 226/180 X |

FOREIGN PATENT DOCUMENTS

| | | |
|---|---|---|
| 1063110 | 8/1959 | Germany . |
| 3151395 | 9/1982 | Germany . |
| 86033 | 2/1986 | Luxembourg . |
| 2090234 | 7/1982 | United Kingdom . |

*Primary Examiner*—Michael Mansen
*Attorney, Agent, or Firm*—Robert W Becker & Associates

[57]            ABSTRACT

A method for conveying a strip of plastically deformable material to a processing device includes the step of conveying the strip in a conveying direction toward the processing device. Cross-sectional areas of the strip are deformed relative to one another perpendicular to the conveying direction, whereby the cross-sectional areas extend perpendicular to the conveying direction and are sequentially arranged in the conveying direction, such that the cross-sectional areas each have one side delimiting one side of the strip, that form together an edge of the strip. The edge extends parallel to the conveying direction and remains parallel to the conveying direction until the strip reaches the processing device. A device for performing the method includes a straightening device for straightening the lateral limiting edge of the strip conveyed on the conveying table.

10 Claims, 5 Drawing Sheets

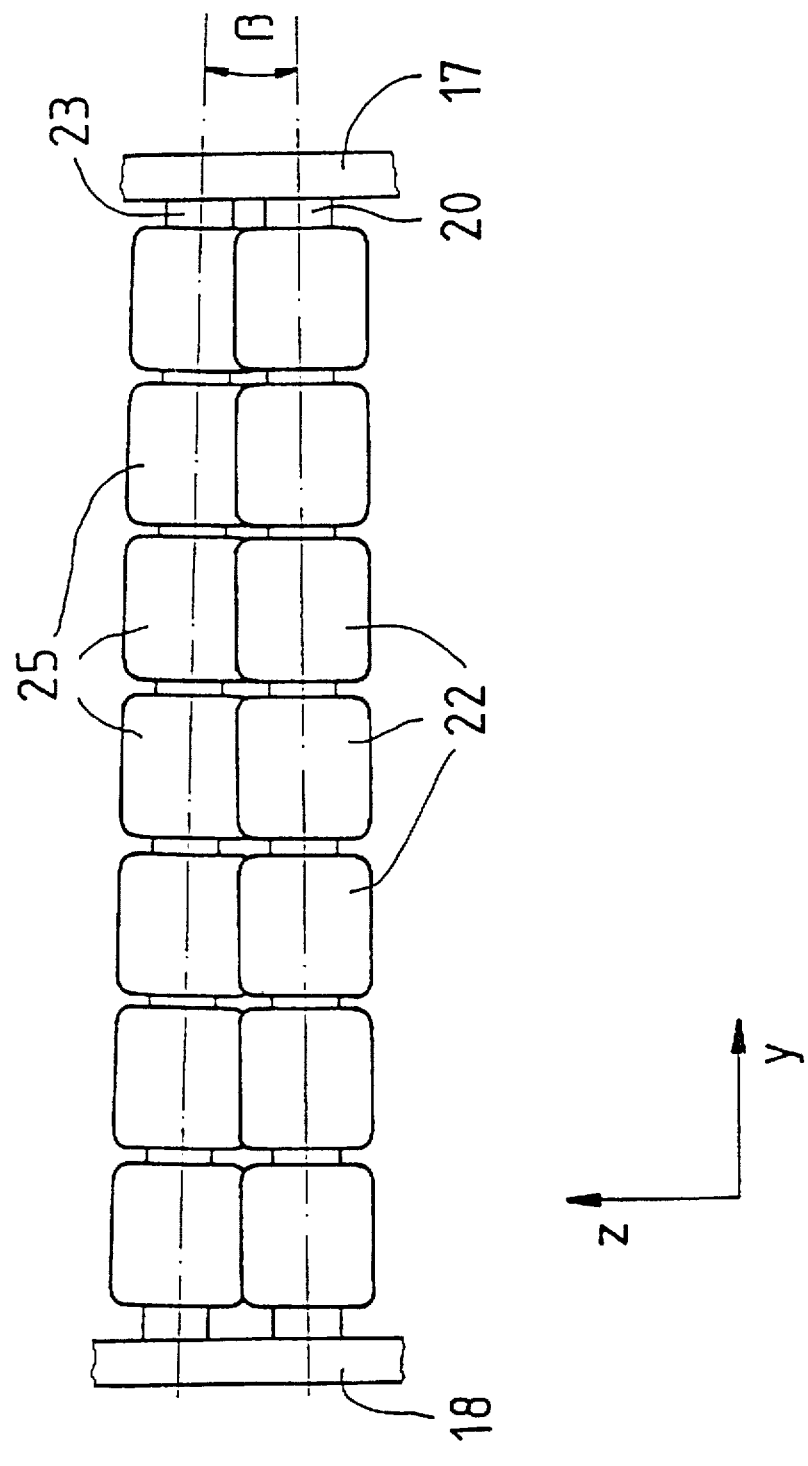

CONVEYING TABLE WITH STRAIGHTENING DEVICE FOR CONTINUOUSLY CONVEYING A DEFORMABLE MATERIAL STRIP

BACKGROUND OF THE INVENTION

The present invention relates to a method for conveying a strip of plastically deformable material, especially a rubber strip or sheet, to a processing device as well as a conveying table for continuously conveying a strip of plastically deformable material, especially of rubber strips or sheets, preferably for the manufacture of tires.

It is known to continuously convey rubber material for tread strips and sidewalls in the form of endless strips to a tire building drum for producing pneumatic vehicle tires. For building the tire, pieces are cut from the continuously conveyed strip to a length corresponding substantially to the circumferential length of the tire and are then placed onto known building drums for finishing the green tire. The continuously conveyed rubber strips, due to their plastic properties, have as a result of their manufacture and as a result of their transport a greatly curved edge contour in the conveying direction with great fluctuations in the direction transverse to the conveying direction at both edges.

For building a high quality vehicle tire the individual rubber strips must be positioned over the entire circumference of the building drum as exactly as possible in the same axial positions. Fluctuations with respect to the axial position especially at connecting areas between the tire tread and the sidewall strips result in non-uniform tire properties over the circumference of the tire. In the conventional tire manufacture, it is thus common practice that during manual application of the cut-to-length strips onto the tire building drum the operator stretches by hand, the strips laterally to the left or to the right for the compensation of fluctuations at the edge line in order to make the edge uniform. In a similar manner, it is known to continuously determine with opto-electric means the edge position during the continuous conveying process in order to detect lateral fluctuations of the edge of the strip and to change the conveying direction to the tire building drum according to the determined values for compensation of fluctuations by lateral displacement of the conveying table. Such a detection requires a high control expenditure. The short period of time for a corresponding reaction between detection of the fluctuation and initiation of a control measure for compensation and the often wide, greatly changing fluctuations (deviations) of the edge position allow for compensation of the greatest amplitudes of the edge cores. However, the edge contour remains, despite the high expenditure for control equipment, very irregular and still wavy. The plasticity of the material also lends itself to the generation of additional curves due to the irregular, sometimes very great deflections in the travel direction. The tenacity (viscosity) of the rubber material furthermore counteracts a quick, exactly defined reaction in response to the detected deviations at the edge.

It is therefore an object of the present invention to improve with simple means the precision in conveying a continuously conveyed plastically deformable strip, especially a rubber strip, preferably for tire manufacture, and thus the further processing in a processing device arranged downstream of the conveying device.

SUMMARY OF THE INVENTION

The method for conveying a strip of plastically deformable material to a processing device according to the present invention is primarily characterized by the following steps:

Conveying the strip in a conveying direction toward a processing device;

Deforming cross-sectional areas of the strip relative to one another perpendicular to the conveying direction, the cross-sectional areas extending perpendicular to the conveying direction and being sequentially arranged in the conveying direction, such that the cross-sectional areas each have one side delimiting one side of the strip, said sides forming together an edge of the strip, the edge extending parallel to the conveying direction and remaining parallel to the conveying direction until the strip reaches the processing device.

Advantageously, the step of deforming includes the step of continuously pressing the cross-sectional areas perpendicular to the conveying direction against lateral straightening elements of a straightening device so as to change their position relative to one another perpendicular to the conveying direction.

Preferably, the step of pressing includes arranging within the straightening device guide rollers at a slant to the conveying direction in a conveying plane of the strip such that the guide rollers laterally guide the strip against the straightening elements deforming the strip in the conveying plane.

Preferably, the step of pressing includes deflecting the strip out of the conveying plane and returning the strip back into the conveying plane with at least two conveying members arranged one after another in the conveying direction within the straightening device, wherein a deflection of the strip out of the conveying plane continuously increases across the width of the strip from one side of the strip to the other side such that the strip across the width is deflected differently and is thus pressed against the lateral straightening elements at a side of the strip where the deflection of the strip is smallest.

The present invention also relates to a conveying table for continuously conveying a strip of plastically deformable material to a processing device. The conveying table according to the present invention is primarily characterized by:

A straightening device for straightening a lateral limiting edge of a strip conveyed on the conveying table;

The conveying table having a constant conveying direction within the straightening device;

The straightening device comprising a device for changing a lateral position of cross-sectional areas of the strip relative to one another perpendicular to the conveying direction, the cross-sectional areas extending perpendicular to the conveying direction and being sequentially arranged in the conveying direction, and for aligning the cross-sectional areas with one side thereof, delimiting one side of the strip, in a line extending parallel to the conveying direction in a lateral position at the conveying table, the lateral position adjustable relative to the width of the conveying table.

The straightening device preferably comprises a means for displacing the strip laterally relative to the conveying direction and further comprises at least one lateral abutment element providing a lateral abutment.

The means for displacing preferably comprises means for deflecting the strip from and returning the strip into a conveying plane, wherein the means for deflecting and returning comprises at least one axle and conveying elements rotatably connected to the at least one axle. The at least one axle is positioned slantedly to at least one plane selected from the conveying plane and a plane perpendicular to the conveying direction.

The axle is expediently positioned at a slant angle α relative to the conveying direction in a plane parallel to the conveying plane and positioned at a slant angle β relative to the conveying plane in the plane perpendicular to the conveying direction.

Preferably, α is smaller than 90° and β is 0° to 20°, wherein α is preferably 60° to 88°.

The slant angle α may also be 60° to 90° while β is greater than 0°; preferably β is 2° to 20 .

Advantageously, the conveying table further comprises a control unit for adjusting the slant angles α and β.

In a further embodiment of the present invention the straightening device comprises at least one means for deflecting the strip from and returning the strip into a conveying plane with a continuously increasing deflection of the strip out of the conveying plane across the width of the strip from one side of the strip to the other side. The straightening device comprises at least one abutment element, for each one of the at least one means for deflecting and returning, arranged downstream of the at least one means for deflecting and returning in the conveying direction. The at least one abutment element penetrates the conveying plane on a side of the strip with the smallest deflection so that the strip, displaced by the means for deflecting and returning to the side with the greatest deflection, is aligned by the at least one abutment element in the conveying plane such that the sides of the cross-sectional areas are straightened in the lateral position.

The conveying table may further comprise a control unit for adjusting the continuously increasing deflection.

By deformation of the cross-sectional areas of the strip, arranged in the conveying direction one after another in a plane perpendicular to the conveying direction, during conveying in an area upstream of the processing device, when viewed in the conveying direction, in a direction transverse to the conveying direction, the cross-sectional areas with one cross-sectional side, delimiting the rubber strip at one side, assume an edge contour parallel to the conveying direction and maintain this parallel alignment until reaching the processing device, so that this lateral surface of the rubber strip is straightened and aligned parallel to the conveying direction. The strip of plastically deformable material can thus be supplied to the processing device with a straight edge while maintaining a constant conveying direction. In this manner, the straightened edge of the plastically deformable strip material maintains its position, i.e., its alignment in the direction transverse to the conveying direction, during the further conveying and feeding process into the processing device. An exact further processing is thus simplified due to the reliably defined edge position transverse to the conveying direction. The products produced within the processing device are thus made more uniform and the product quality is thus improved. Thus, high expenditures with regard to control units for ensuring the strip position are obsolete.

The embodiment of the conveying table for continuously conveying plastically-deformable strip material to a processing device with a straightening device for straightening a lateral delimiting edge of the strip and with constant (unchanging) conveying direction in the area of the straightening device provides, due to the means for changing the lateral position of the cross-sectional areas of the strip, sequentially arranged in the conveying direction and extending transverse to the conveying direction, and for aligning the cross-sectional areas with one side thereof delimiting the strip in a line parallel to the conveying direction in an adjustable lateral position of the width of the conveying table, an exact adjustment of a side, limiting the continuously conveyed plastically deformable strip material, in a line parallel to the conveying direction in a lateral position adjustable according to the individual requirements of the processing device relative to the width of the conveying table is made possible. The strip of plastically deformable material can be fed to the processing device, without requiring expensive control devices for changing the conveying direction, in a defined, constant position relative to the width of the conveying table. Expensive control devices can thus be eliminated.

The processing quality is thus improved with simple means by deforming the rubber strip in a straightening device arranged upstream of the processing device in the direction of conveying.

With the continuous lateral pressing of the rubber strip against lateral straightening elements in the area of the straightening device such that the position of the cross-sectional areas, arranged one after another in the direction of conveying, is changed relative to one another in a direction perpendicular to the conveying direction, a constant straight edge contour parallel to the conveying direction is generated at the continuously conveyed strip of plastically deformable material with simple means.

One embodiment of the method is preferred in which the straightening device comprises guide rollers positioned at a slant to the conveying direction of the rubber strip so that under deformation of the rubber strip in its conveying plane the rubber strip is laterally forced (pressed) against the straightening elements of the straightening device. With only minimal frictional loss the slantedly arranged guide rollers ensure a safe conveying through the straightening device in the conveying direction as well as a lateral displacement of the strip toward the straightening elements against which the strip is pressed so that, due to the continuous conveying process, the strip is deformed so as to have a straight edge.

A deflection of the strip may be achieved with respective deflecting and returning means for deflecting the strip from the conveying plane and returning the strip into the conveying plane, whereby the strip deflection continuously increasing from the side of the strip facing the straightening elements to the opposite side. The continuously increasing deflection results in a continuous lateral displacement of the strip toward the side with the smallest deflection and against the lateral straightening elements positioned thereat. Accordingly, the cross-sectional areas of the rubber strip, arranged in the conveying direction one after another, are laterally displaced in a direction transverse to the conveying direction and are aligned with their side facing the lateral straightening elements so as to form a straight line parallel to the conveying direction.

By providing means for deflecting the strip from and returning the strip into the conveying plane in the form of at least one axle and conveying elements rotatably connected to this at least one axle, with the axle positioned slantedly to the conveying plane and/or a plane perpendicular to the conveying direction, it is ensured with simple means and minimal frictional loss that a continuous conveying in the conveying direction as well as a forcing of the strip, due to frictional contact between the strip and the conveying elements, against the lateral straightening elements is realized. Due to the non-parallel arrangement of the axle, the strip is subjected to a lateral force component and a lateral displacement toward the straightening elements caused by the conveying elements positioned at a slant. Due to the non-parallel arrangement of the axle to the conveying plane, the conveyed strip is subjected to continuously changing deflections transverse to the conveying direction. For certain frictional coefficients between the plastically deformable material and the conveying elements, it is possible to provide the ideal force component for pressing the plastically deformable strip against the straightening elements suitably adjusting the angle $\beta$ of the conveying elements relative to the plane of conveying. For optimizing the process, the axle can be positioned at an angle $\alpha$ to the conveying direction as well as at an angle $\beta$ to the conveying plane in a plane transverse to the conveying direction. For an individual fine adjustment of different materials to be conveyed, it is advantageous to have the axle adjustable with respect to the angle $\alpha$ and/or the angle $\beta$. The conveying elements can be freely rotatably supported on the axle so that the deflection is caused only by the conveying velocity transmitted by the conveying means onto the strip to be conveyed and the frictional forces between the strip conveyed and the freely rotatably conveying elements. For special applications it is also suggested to embody the conveying elements such that they are operatively connectable with known controllable drive means, for example, via a coupling device.

BRIEF DESCRIPTION OF THE DRAWINGS

The object and advantages of the present invention will appear more clearly from the following specification in conjunction with the accompanying drawings, in which:

FIG. 5 is a schematic cross-sectional representation along section line V—V of FIG. 4.

DESCRIPTION OF PREFERRED EMBODIMENTS

The present invention will now be described in detail with the aid of several specific embodiments utilizing FIGS. 1 through 5.

Figure 1:
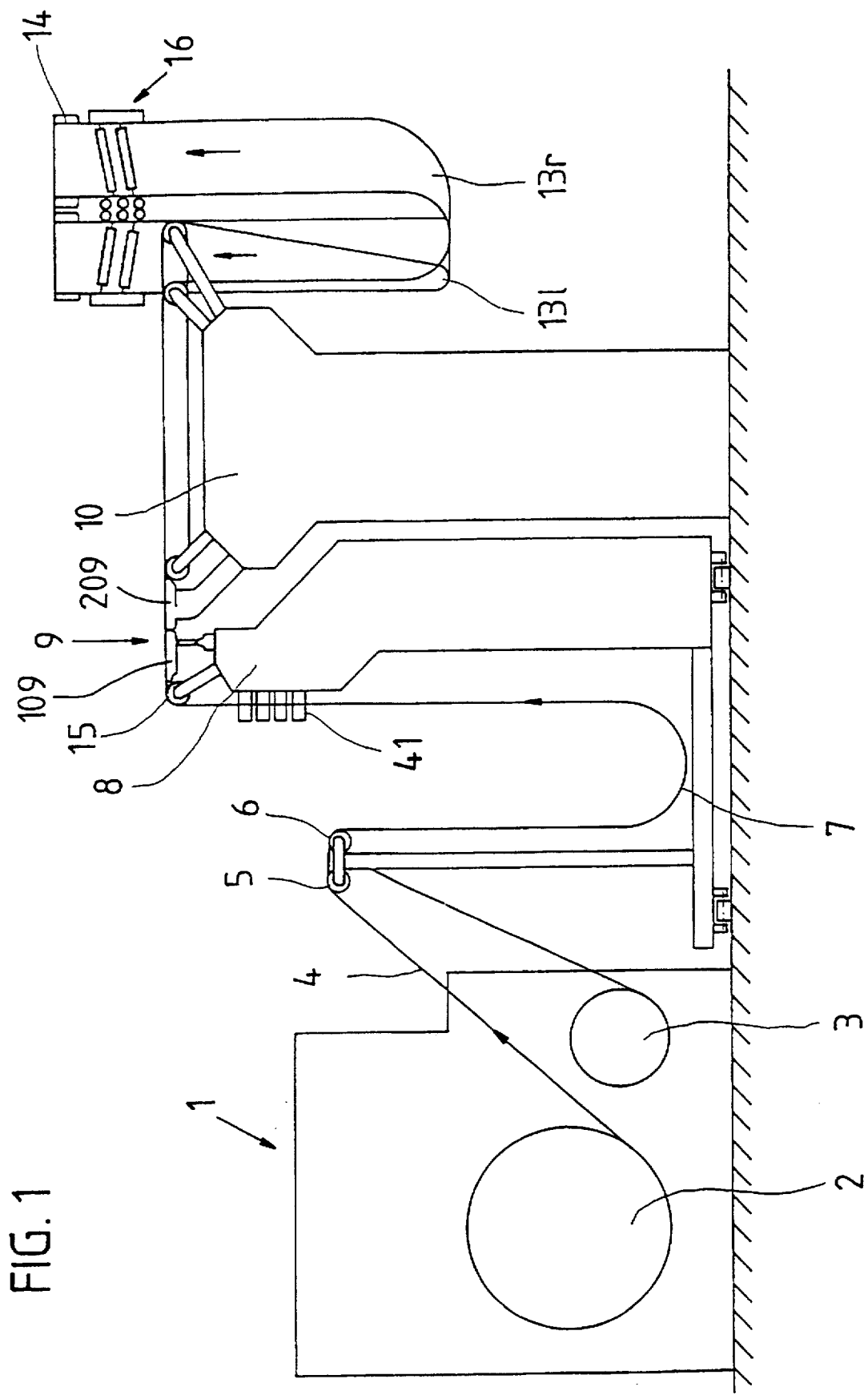
FIG. 1 is a schematic representation of the transport of a rubber strip for producing a sidewall to the building drum in a side view.
Figure 2:
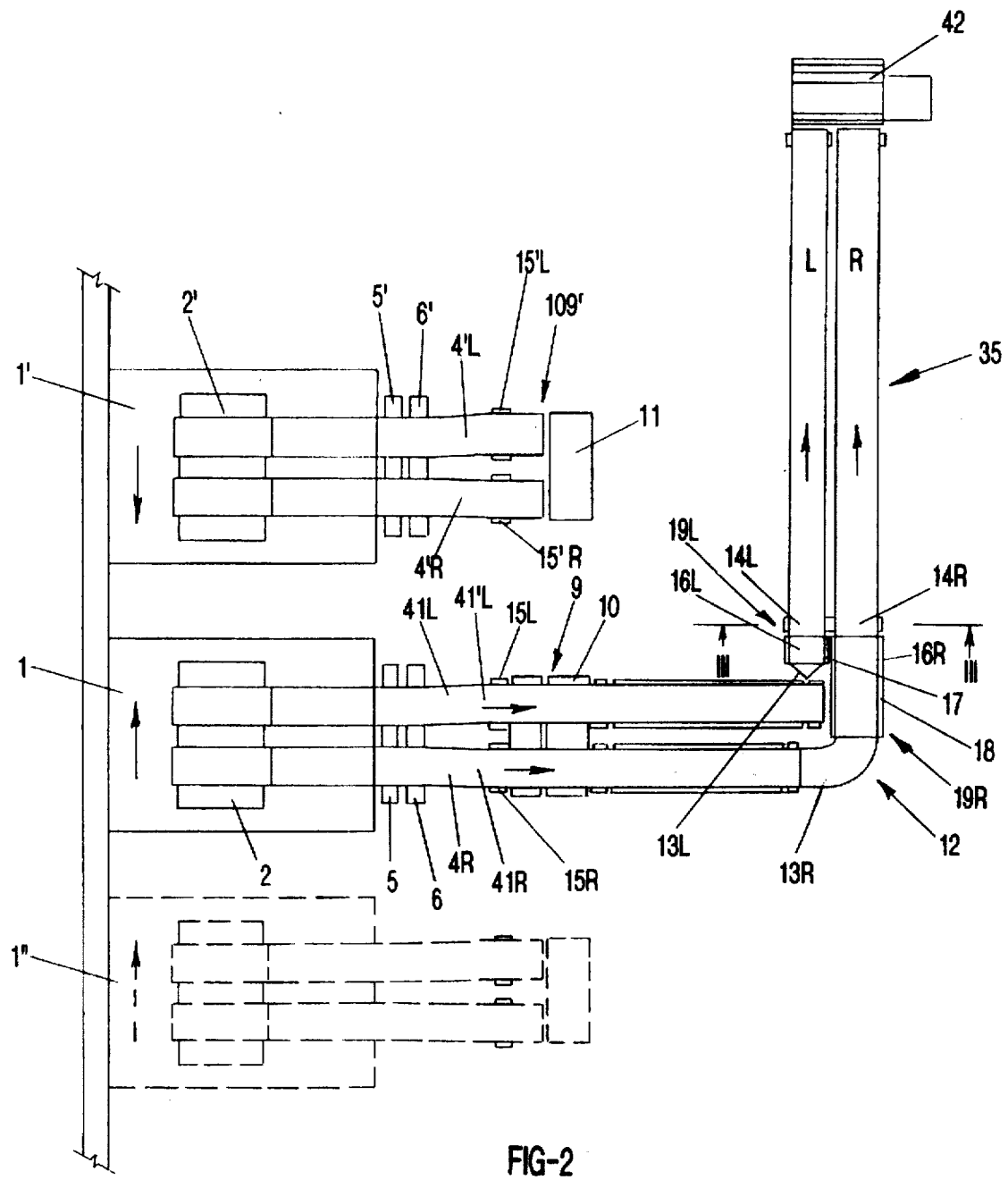
FIG. 2 is a representation of FIG. 1 in a top view.

FIGS. 1 and 2 show the schematic construction of the transport path of continuously conveyed rubber strips for manufacturing tire sidewalls wherein the rubber strips are withdrawn from a storage device 1 of a known design and conveyed to a tire building drum 42 of a known design. Since for the manufacture of vehicle tires two substantially identical tire sidewalls are manufactured in parallel, two rubber strips 4 (l), 4 (r) are withdrawn in parallel from the strip storage device 1 and guided to the tire building drum for producing a left and a right tire sidewall. Since the conveying direction for both rubber strips 4 (l), 4 (r) is identical and mirror-symmetrical to the center line between the conveying paths, in the following the conveying of the right rubber strip 4 (r) will be described in an exemplary fashion.

The strip storage device 1 is embodied, in a manner known per se, of a winding drum 3 and a supply drum 2. The rubber strip material which, in a manner known per se, is placed onto a separating fabric layer is removed from the supply drum 2 together with the fabric layer and guided to a guide pulley 5. Downstream of the guide pulley 5, the fabric layer is separated from the rubber strip 4 and guided downwardly where it is received by the winding drum 3. In the area of the guide pulley 5 the rubber strip 4, separated in a manner known per se from the fabric material, is guided about the guide pulley 6 into a storage loop 7 and is then introduced to the conveying tables 8 and 10. Via a further storage loop 13l, 13r with 90° change of direction and respective guide rollers, the rubber strip 4, after change of direction, is guided vertically upwardly to the conveying table 19r, 19l and a straightening device 16r, 16l where it is guided via guide rollers 14 and a driven conveyor belt 35 to the tire building drum 42. If enough space is available, the change of direction by 90° is not required.

Figure 3:
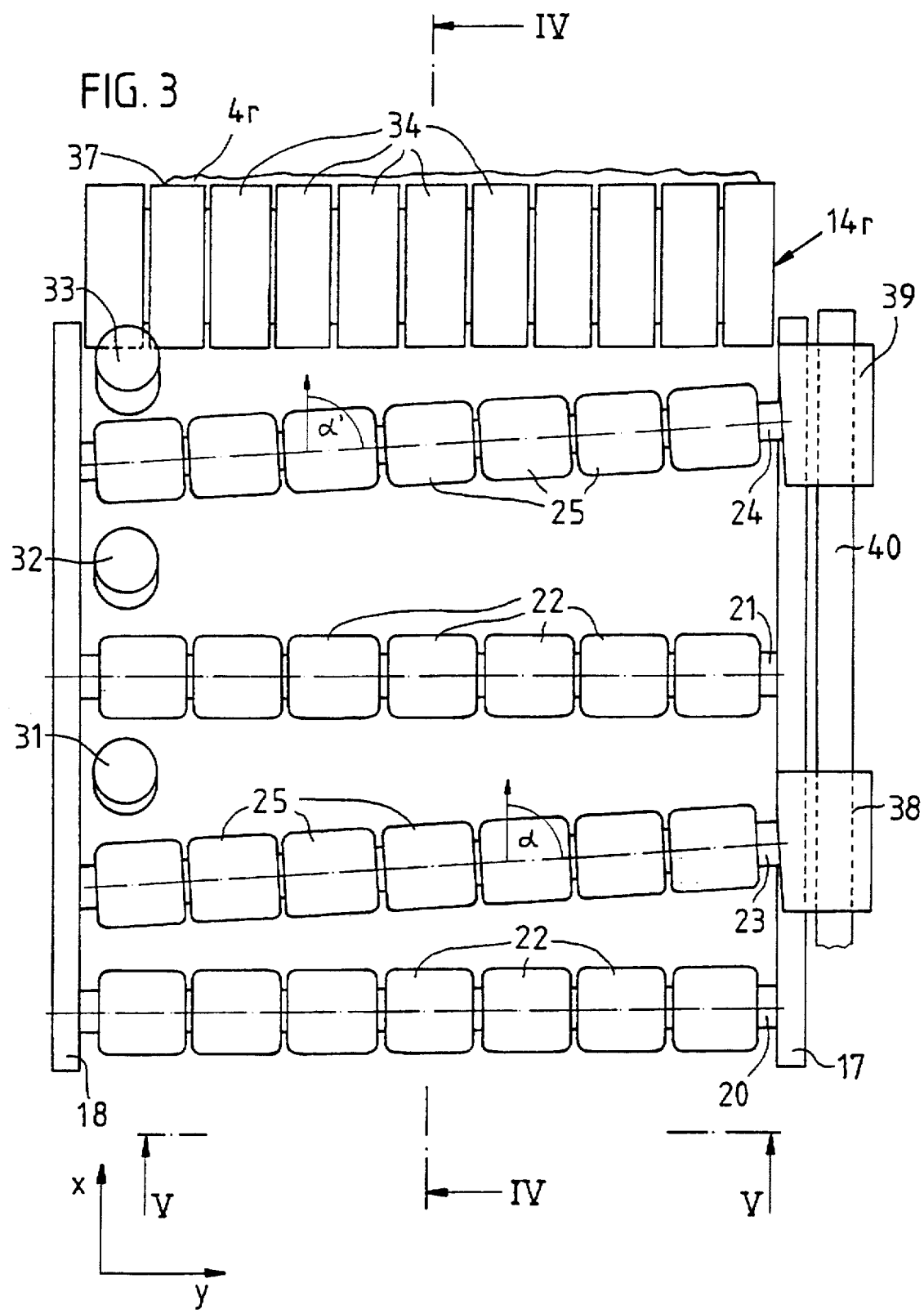
FIG. 3 is a schematic representation of a conveying table with straightening device according to section line III—III of FIG. 2.
Figure 4:
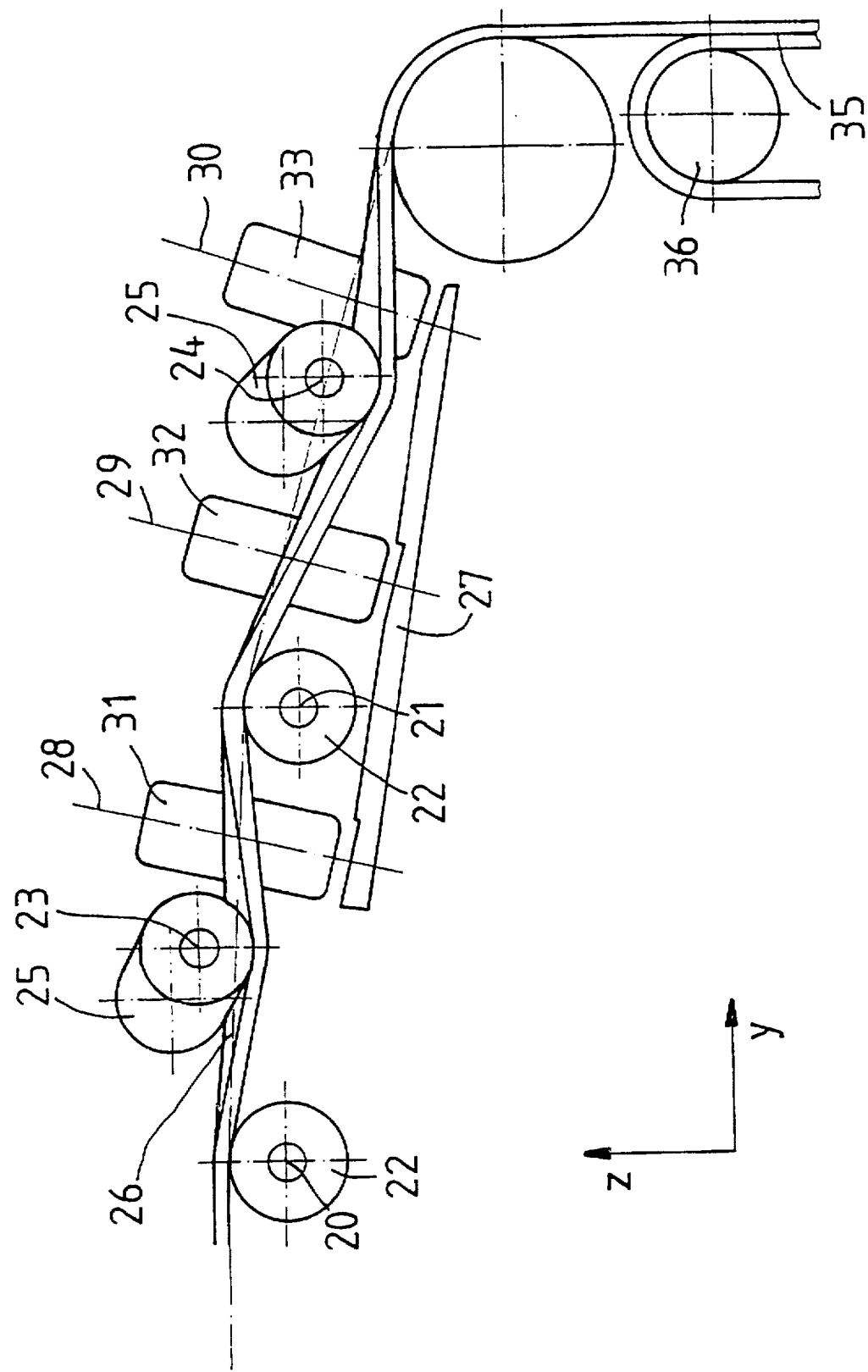
FIG. 4 shows the conveying table of FIG. 3 in a sectional view according to line IV—IV of FIG. 3.

As represented in FIGS. 3 and 4, within the conveying table 19r, or 19l axles 20 and 21 are provided which, in the conveying direction, are arranged one after another transverse to the conveying direction. On the axles 20, 21 guide rollers 22 are provided uniformly spaced from one another across the width of the conveying table which are rotatable independent from one another. The rubber strip 4 is pulled by the conveying belt 35, which is guided about rotatably supported guide pulleys (one of which is shown as guide pulley 36 in FIG. 4) and connected drivingly to a controllable drive unit, via the guide rollers 22 and via rollers 34, connected to a deflecting axle 14 in an equidistant arrangement over the width of the conveying table. The rollers 34 are independently rotatable. The tangential planes at the guide rollers 22 of the axle 20, at the guide rollers 22 of the axle 21 arranged downstream in the conveying direction, and at the roller 34 of the axle 14 form the conveying plane 26, represented in a dash-dotted line, between the axles 20 and 14.

Between the axles 20 and 21, an axle 23 is supported in a sidewall 18 and within a bearing piston 38. It extends transverse to the conveying direction across the entire width of the conveying table. Between the axle 21 and the axle 14, another axle 24 supported in the sidewall 18 and at the bearing piston 39 is provided. It also extends transverse to the conveying direction over the entire width of the conveying table. The axles 23 and 24 are positioned at an angle $\alpha$, respectively, $\alpha'$ to the conveying direction. As indicated schematically in FIG. 5, the axles 23 and 24 are positioned in a plane that extends perpendicular to the conveying plane at an angle $\beta$, respectively, $\beta'$ to the conveying plane. With the aid of a control shaft 40, the pistons 38 and 39 can be rotated about the control shaft 40 so that the angles $\beta$, $\beta'$ can be adjusted according to the specific requirements.

As can be seen in FIGS. 2, 3 and 4, at the right conveying table 19r at its left side facing the left conveying table 19l, between the axles 23 and 21 as well as between the axles 21 and 24 and between the axles 24 and 14, an axle 28, 29, 30 is connected respectively to a plate 27 mounted on the left side part 18. The axles 28–30 extend perpendicular to the conveying plane in a plane parallel to the conveying direction. On the axles 28, 29, 30 a cylindrical roller body is rotatably supported respectively which provides an abutment element 31, 32, 33 penetrating through the conveying plane 26.

The angles $\alpha$, $\alpha'$ of the axles 23, 24, measured relative to the direction of conveying in the direction of conveying so as to rotate to the right, are smaller than 90°, for example 84°. Depending on the friction coefficient between the rollers and conveying elements and the rubber strip it is possible to limit the angular range for ensuring a reliable conveying to 82° to 86°. The axles 23 and 24 are arranged such that their conveying elements (rollers) 25 extend with their outer diameter to the side of the conveying plane 26 where the axles 20, 21, 14 are provided. The rubber strip is guided between the guide rollers 22 of the axles 20 and 21 and the rollers 34 of the deflecting axle 14, on the one hand, and the conveying elements (rollers) 25 of the axles 23 and 24, on the other hand. It is deflected by the rollers 25 from the conveying plane defined by the rollers 22, 34 and returned by the guide rollers 22 and rollers 34 into the conveying plane. The rubber strip and the rollers 22, 25, 34 are thus in operative frictional contact. The slanted position of the axles 23 and 24 determined by selecting the angles α, α' results in a transverse displacement of the rubber strip 4 effected by the rollers 25 toward the rotatable abutment elements 31, 32, 33. The rubber strip 4 is forced with its edge 37 facing the abutments 31, 32, 33 against these abutments and is simultaneously conveyed in the conveying direction. Accordingly, the edge 37 is aligned or straightened in the tangential plane of the abutment rollers 31, 32, 33 which extends parallel to the conveying direction by deformation of the cross-sectional areas of the rubber strip 4. The rubber strip 4 in the aligned state is conveyed about the rollers 34 via the conveyor belt 35 to the tire building drum and is thus fed thereto in an aligned state.

Due to the embodiment of the deflecting rollers 34 as independent rollers of minimal axial width which are rotatable parallel to one another, these deflecting rollers 34 rotate relative to one another according to the respective thickness of the rubber material thereon and the resulting deflecting radius to the neutral line of the rubber material such that relative to one another the position of the abutment edge 37 will not change as a result of the different thickness of the rubber material even upon deflection about the axis 14.

For reinforcing the displacement movement laterally toward the abutment elements 31, 32, 33, depending on the respective requirements, the axles 23 and 24, as shown in FIG. 5, can be rotated about an angle β, β' from a plane parallel to the conveying plane with the aid of the control shaft 40 and the bearing pistons 38, 39 so that the rollers 25 adjacent to the abutment elements 31, 32, 33 are deflected by the smallest amount and the rollers 25 farthest away from the abutment elements 31, 32, 33 are deflected by the greatest amount. For example, the angles β, β' can be adjusted individually in a range of 0° to 15°. An angle β=6° is especially advantageous.

It is also possible to embody the device such that the angles α, α' are adjustable. Furthermore, it is possible to embody the axles 23, 24 such that they have a predetermined angle β, β' and that only the angles α, α' are adjustable.

It is also possible, especially in devices with only minimal conveying velocities, to provide the straightening device, instead of with two axles 20, 21 and two axles 23, 24 positioned at a slant angle, with only one axle 20 and one axle 23 positioned at an angle. It is also possible to vary the number of abutment elements provided.

It is also feasible to provide such straightening devices additionally within the area of conveying between the storage device 1 and the tire building drum 42 upstream of special devices for further processing within the conveying path. For example, it is possible to embody the conveying area between the storage device 1 and the conveying table 8 so as to be laterally displaceable, as shown in FIG. 1 and FIG. 2, in order to be able to exchange the rubber supply when the supply drum 2 is empty. After emptying of the winding drum 3 the entire displaceable device is moved from the working position into a position "in which the storage device 1 assumes the position 1". A unit, identically embodied between storage device 1 and conveying table 8, is then moved from position 'in which the storage device 1 assumes the position 1' into the working position. While still in the old position, the new rubber strip 4 is pulled of the storage device 1' through the storage loop about guide pulleys 15'r, 15'l onto the table top 109' at the conveying table. It is possible to provide upstream of the deflecting rollers 15 in the conveying direction a straightening device 41, as schematically shown in FIG. 1 and 2.

The straightening device 41 has substantially the same construction as the aforedisclosed straightening device 16. For deflecting the rubber strip onto the table top 109, instead of the deflecting rollers 34, disclosed in connection with a straightening device 16, the deflecting rollers 15 are positioned equidistantly spaced and rotatably supported parallel to one another. Such a straightening device 41 allows for a conveying of the rubber strip 4 in a constant position transverse to the conveying direction in the position 1' of the storage device 1 across the table top 9' and a stationary table top 11. In a thus aligned state the conveying is interrupted and the rubber strip is cut between table top 109' and table 11 with a cut transverse to the conveying direction at one end face. Thus, the rubber strip, in the position transverse to the conveying direction as well as at the cut surface at the end face, is provided with exactly defined edges. After displacement of the entire device comprised of storage device 1 and conveying table 8 from the position 1', respectively, 8' into their working position 1, respectively, 8, in which the table top 109 is positioned opposite a conveying table 10 with feed plate 209, the new rubber strip has the same position transverse to the conveying direction as the previous rubber strip removed via the feed plate 209 of the conveying table 10. The new leading edge of the rubber strip can then be exactly combined with the old rubber strip end. Even when an end of a previous rubber strip is missing within the area of the feed plate 209, the new rubber strip has the position required for further transport. Due to the minimal conveying velocity in the area of the straightening device 41, it is sufficient to embody the straightening device with only one axle 23 positioned at a slant to the conveying direction.

The present invention is, of course, in no way restricted to the specific disclosure of the specification and drawings, but also encompasses any modifications within the scope of the appended claims.

What we claim is:

1. A conveying table for continuously conveying a strip of plastically deformable material to a processing device, said conveying table comprising:

a straightening device for straightening a lateral limiting edge of a strip conveyed on said conveying table in a constant conveying direction within said straightening device;

said straightening device comprising a device for changing a lateral position of cross-sectional strip areas, extending perpendicular to said conveying direction and being sequentially arranged in said conveying direction, relative to one another and perpendicular to said conveying direction, and a device for aligning the cross-sectional strip areas with one side thereof, delimiting one side of said strip, in a line extending parallel to said conveying direction in a lateral position at said conveying table, said lateral position adjustable relative to a width of said conveying table;

wherein said device for changing comprises a means for displacing the strip laterally relative to said conveying direction;

wherein said means for displacing comprise means for deflecting the strip from and returning the strip into a conveying plane, wherein said means for deflecting and returning comprises at least one axle and conveying elements rotatable connected to said at least one axle, wherein said at least one axle is positioned slantedly to at least one plane selected from said conveying plane and a plane perpendicular to said conveying direction.

2. A conveying table according to claim 1, wherein said device for aligning comprises at least one lateral abutment element providing a lateral abutment.

3. A conveying table according to claim 1, wherein said at least one axle is positioned at a slant angle a relative to said conveying direction in a plane parallel to said conveying plane and positioned at a slant angle β relative to said conveying plane in said plane perpendicular to said conveying direction.

4. A conveying table according to claim 3, wherein α<90° and β is 0° to 20°.

5. A conveying table according to claim 4, wherein α is 60° to 88°.

6. A conveying table according to claim 3, wherein a is 60° to 90° and β>0°.

7. A conveying table according to claim 6, wherein β is 2° to 20°.

8. A conveying table according to claim 3, further comprising a control unit for adjusting said slant angles α and β.

9. A conveying table for continuously conveying a strip of plastically deformable material to a processing device, said conveying table comprising:

a straightening device for straightening a lateral limiting edge of a strip conveyed on said conveying table in a constant conveying direction within said straightening device;

said straightening device comprising a device for changing a lateral position of cross-sectional strip areas, extending perpendicular to said conveying direction and being sequentially arranged in said conveying direction, relative to one another and perpendicular to said conveying direction and a device for aligning the cross-sectional strip areas with one side thereof, delimiting one side of said strip, in a line extending parallel to said conveying direction in a lateral position at said conveying table, said lateral position adjustable relative to a width of said conveying table;

wherein said device for changing comprises at least one means for deflecting the strip from and returning the strip into a conveying plane with a continuously increasing deflection of said strip out of said conveying plane across a width of said strip from one side of said strip to the other side, said device for aligning comprising at least one abutment element for each one of said at least one means for deflecting and returning, arranged downstream of said at least one means for deflecting and returning in said conveying direction, said at least one abutment element penetrating said conveying plane on a side of the strip with the smallest deflection so that the strip, displaced by said means for deflecting and returning to the side with the greatest deflection, is aligned by said at least one abutment element in said conveying plane such that the sides of the cross-sectional areas are straightened in said lateral position.

10. A conveying table according to claim 9, further comprising a control unit for adjusting said continuously increasing deflection.

\* \* \* \* \*